United States Patent
Lee et al.

(10) Patent No.: US 8,921,436 B2
(45) Date of Patent: *Dec. 30, 2014

(54) MICROPOROUS POLYOLEFIN-BASED AEROGELS

(71) Applicant: Aspen Aerogels, Inc., Northborough, MA (US)

(72) Inventors: Je Kyun Lee, Brookline, MA (US); George L Gould, Mendon, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/896,156

(22) Filed: May 16, 2013

(65) Prior Publication Data

US 2014/0080932 A1    Mar. 20, 2014

Related U.S. Application Data

(63) Continuation of application No. 11/278,940, filed on Apr. 6, 2006, now Pat. No. 8,461,223.

(60) Provisional application No. 60/594,435, filed on Apr. 7, 2005.

(51) Int. Cl.
| | | |
|---|---|---|
| *C08J 9/28* | (2006.01) | |
| *C08J 9/00* | (2006.01) | |
| *C08F 36/00* | (2006.01) | |
| *C08F 36/02* | (2006.01) | |
| *C08F 36/20* | (2006.01) | |
| *C08G 61/08* | (2006.01) | |
| *C08F 34/00* | (2006.01) | |

(52) U.S. Cl.
CPC ............ *C08F 34/00* (2013.01); *C08J 2203/08* (2013.01); *C08G 2261/3325* (2013.01); *C08G 61/08* (2013.01); *C08J 9/28* (2013.01); *C08J 2201/0502* (2013.01); *C08G 2261/418* (2013.01); *C08J 2205/026* (2013.01)
USPC .............. 521/150; 521/50; 521/64; 521/142; 526/336

(58) Field of Classification Search
USPC .............. 521/64, 142, 143, 50, 150; 526/336
See application file for complete search history.

(56) References Cited

U.S. PATENT DOCUMENTS

| | | |
|---|---|---|
| 2,117,605 A | 5/1938 | Fowler et al. |
| 2,174,770 A | 10/1939 | Wilson |
| 2,188,007 A | 1/1940 | Kistler |
| 2,870,109 A | 1/1959 | Nickerson |
| 4,237,023 A | 12/1980 | Johnson et al. |
| 4,363,738 A | 12/1982 | Kummermehr |
| 4,400,340 A | 8/1983 | Klosiewicz |
| 4,447,345 A | 5/1984 | Kummermehr et al. |
| 4,463,102 A | 7/1984 | Forester |
| 4,469,809 A | 9/1984 | Klosiewicz |
| 4,740,537 A | 4/1988 | Silver |
| 4,873,218 A | 10/1989 | Pekala |
| 4,935,479 A | 6/1990 | Lau et al. |
| 4,954,327 A | 9/1990 | Blount |
| 4,997,804 A | 3/1991 | Pekala |
| 5,081,163 A | 1/1992 | Pekala |
| 5,086,085 A | 2/1992 | Pekala |
| 5,149,764 A | 9/1992 | Lau et al. |
| 5,252,654 A | 10/1993 | David et al. |
| 5,254,638 A | 10/1993 | Novak et al. |
| 5,270,027 A | 12/1993 | Balducci et al. |
| 5,275,796 A | 1/1994 | Tillotson et al. |
| 5,292,851 A | 3/1994 | Lau et al. |
| 5,306,555 A | 4/1994 | Ramamurthi et al. |
| 5,420,168 A | 5/1995 | Mayer et al. |
| 5,476,878 A | 12/1995 | Pekala |
| 5,478,867 A | 12/1995 | Tabor |
| 5,484,818 A | 1/1996 | De Vos et al. |
| 5,565,142 A | 10/1996 | Deshpande et al. |
| 5,569,513 A | 10/1996 | Fidler et al. |
| 5,637,660 A | 6/1997 | Nagy et al. |
| 5,728,785 A | 3/1998 | Grubbs et al. |
| 5,786,059 A | 7/1998 | Frank et al. |
| 5,789,075 A | 8/1998 | Frank et al. |
| 5,830,387 A | 11/1998 | Yokogawa et al. |

(Continued)

FOREIGN PATENT DOCUMENTS

| | | |
|---|---|---|
| EP | 1512714 A1 | 3/2005 |
| EP | 1512714 B1 | 3/2005 |

OTHER PUBLICATIONS

Definition of "Aerogel." IUPAC Gold Book. 2007.*
Definition of "Xerogel." IUPAC Gold Book. 2007.*

(Continued)

*Primary Examiner* — Kara Boyle
(74) *Attorney, Agent, or Firm* — Mark Hanson; Poongunran Muthukumaran

(57) ABSTRACT

Microporous polyolefin and microporous polydicyclopentadiene (polyDCPD) based aerogels and methods for preparing and using the same are provided. The aerogels are produced by forming a polymer gel structure within a solvent from a olefin or dicyclopentadiene monomer 5 via Ring Opening Metathesis Polymerization (ROMP) reactions, followed by supercritical drying to remove the solvent from the aerogel. Other aerogels are prepared by sequentially (1) mixing at least one dicyclopentadiene monomer, at least one solvent at least one catalyst and at least one inorganic and/or organic reinforcing material, (2) gelling the mixture, (3) aging, and (4) supercritical drying. Aerogels provided herein are inexpensive to prepare, possess desirable 10 thermal, mechanical, acoustic, chemical, and physical properties and are hydrophobic. The aerogels provided herein are suitable for use in various applications, including but not limited to thermal and acoustic insulation, radiation shielding, and vibrational damping applications.

23 Claims, No Drawings

(56) References Cited

U.S. PATENT DOCUMENTS

| | | |
|---|---|---|
| 5,831,108 A | 11/1998 | Grubbs et al. |
| 5,840,646 A | 11/1998 | Katayama |
| 5,852,146 A | 12/1998 | Reichle et al. |
| 5,866,027 A | 2/1999 | Frank et al. |
| 5,869,545 A | 2/1999 | Biesmans et al. |
| 5,917,071 A | 6/1999 | Grubbs et al. |
| 5,942,513 A | 8/1999 | Bigge et al. |
| 5,962,539 A | 10/1999 | Perrut et al. |
| 5,972,254 A | 10/1999 | Sander |
| 5,973,015 A | 10/1999 | Coronado et al. |
| 6,020,443 A | 2/2000 | Woodson et al. |
| 6,034,190 A | 3/2000 | Katayama et al. |
| 6,068,882 A | 5/2000 | Ryu |
| 6,080,475 A | 6/2000 | Frank et al. |
| 6,087,407 A | 7/2000 | Coronado et al. |
| 6,111,121 A | 8/2000 | Grubbs et al. |
| 6,127,306 A | 10/2000 | Husing et al. |
| 6,197,270 B1 | 3/2001 | Sonoda et al. |
| 6,271,292 B1 | 8/2001 | Mager et al. |
| 6,284,852 B1 | 9/2001 | Lynn et al. |
| 6,310,121 B1 | 10/2001 | Woodson et al. |
| 6,315,971 B1 | 11/2001 | Wallace et al. |
| 6,426,419 B1 | 7/2002 | Grubbs et al. |
| 6,465,554 B1 | 10/2002 | Van Der Schaaf et al. |
| 6,479,416 B1 | 11/2002 | Frank et al. |
| 6,486,279 B2 | 11/2002 | Lynn et al. |
| 6,511,756 B1 * | 1/2003 | Obuchi et al. ............ 428/517 |
| 6,610,626 B2 | 8/2003 | Grubbs et al. |
| 6,620,355 B1 | 9/2003 | Schmidt |
| 6,635,768 B1 | 10/2003 | Herrmann et al. |
| 6,670,402 B1 | 12/2003 | Lee et al. |
| 6,759,537 B2 | 7/2004 | Grubbs et al. |
| 6,770,584 B2 | 8/2004 | Barney et al. |
| 6,818,586 B2 | 11/2004 | Grubbs et al. |
| 6,838,489 B2 | 1/2005 | Bell et al. |
| 6,887,563 B2 | 5/2005 | Frank et al. |
| 7,078,359 B2 | 7/2006 | Stepanian et al. |
| 2002/0094426 A1 | 7/2002 | Stepanian et al. |
| 2003/0077438 A1 | 4/2003 | Frank et al. |
| 2003/0186035 A1 * | 10/2003 | Cruce et al. ............ 428/292.4 |
| 2004/0132845 A1 | 7/2004 | Rhine et al. |
| 2004/0132846 A1 | 7/2004 | Leventis et al. |
| 2005/0192366 A1 | 9/2005 | Ou et al. |

OTHER PUBLICATIONS

Lee, Je Kyun "Nanostructured Poly-DCPD Based Aerogels as Low Cost Thermal and Acoustic Insulation for Aerospace Applications" DARPA SBIR 2003 Abstract, posted May 1, 2003.

Kessler et al. "Cure Kinetics of the Ring-Opening Metathesis Polymerization of Dicyclopentadiene" Journal of Polymer Science (2002) 40: 2373-2383.

Xiang "The Discovery and Development of Ruthenium-Catalyzed Olefin Metathesis" Presentation (Unknown Venue) Mar. 18, 2005, 47 slides.

Kistler "Coherent Expanded Aerogels" Journal of Physical Chemistry (1932) 36: 52-64.

Grubbs et al. "Recent Advances in Olefin Metathesis Polymerization and its Application in Organic Synthesis" Tetrahedron (1998) 54: 4413-4450.

Pekala et al. "Structure of Organic Aerogels 1. Morphology and Scaling" Macromolecules (1993) 26: 5487-5493.

Li et al. "Ring-opening Metathesis Polymerization of Dicyclopentadiene by Tungsten Catalysts Supported on Polystyrene" Journal of Molecular Catalysis A: Chemical (1999) 147: 83-88.

* cited by examiner

MICROPOROUS POLYOLEFIN-BASED AEROGELS

This application is a continuation application of U.S. patent application Ser. No. 11/278,940 which claims priority from U.S. Provisional Application Ser. No. 60/594,435, filed on Apr. 7, 2005, both of which are incorporated herein in their entirety.

GOVERNMENT INTEREST

This invention was made with the United States Government support under Contract no. W31P4Q-04-C-R087 awarded by the United States Army. The Government has certain rights in the invention.

BACKGROUND

1. Field of the Invention

This invention relates to polyolefin aerogels, polyolefin microporous materials, methods of making same and articles composed of said aerogels or microporous materials. More particularly, the invention provides microporous poly(dicyclopentadiene) materials prepared by ring-opening metathesis polymerization, polymerization and drying methods of making same and articles composed of the poly(dicyclopentadiene) materials.

2. Background of the Invention

Aerogels, invented in 1931 by Kistler, (Kistler, S. S., "Coherent Expanded Aerogels and Jellies", Nature, 127, 741 (1931) and "Coherent Expanded Aerogels" J. Physical Chem., 36, 52 (1932)), are formed from a gel by replacing the liquid phase with air. The first aerogels produced by Kistler had silicon dioxide (silica) as the solid phase of the gel structure. Silica gels can be formed via polymerization of silicic acid ($Si(OH)_4$). Aerogels prepared from sol-gel processing with silica oxides have been quite interesting due to their extremely low density, high surface area, and attractive optical, dielectric, thermal and acoustic properties. These excellent properties explain why aerogels have been considered for use in many important applications such as thermal insulations. More detailed description can be found in the following references: LeMay et al., "Low-Density Microcellular Materials", MRS Bulletin, December 1990, p. 19-44, and D. Schaefer, "Structure of mesoporous aerogels", MRS Bulletin, April 1994, p. 49-53.

The ambient pressure drying process is called the "xerogel" process, and results organic and inorganic based wet gel with many physical properties which differ from aerogels. For example, U.S. Pat. No. 5,478,867 disclosed a microporous isocyanate-based xerogel composition and method of its preparation using a vacuum oven. However, this ambient pressure drying process generally shows more shrinkage and damage due to surface tension forces during drying. Moreover, the drying time for xerogels is relatively very long.

The primary approach to making aerogels is to dry the gel matrix in a supercritical fluid medium. Kistler used a supercritical alcohol process to dry the gel matrix. Such processes, though successful, are energy intensive due to higher critical points of alcohols. Another method is to use supercritical carbon dioxide, which has a relatively lower critical point. During supercritical drying, the temperature and the pressure are increased beyond the critical point where the phase boundary between the liquid and vapor phase disappears. Once the critical point is passed, there is no distinction between the liquid and vapor phase and the solvent can be removed without introducing a liquid-vapor interface, capillary pressure, or any associated mass transfer limitations. Liquid $CO_2$ is generally used as the supercritical extraction fluid because the process can be performed near ambient temperature. A good description of supercritical drying technology may be found in a recent process patent, U.S. Pat. No. 6,670,402, which discloses a rapid aerogel production process utilizing a unique supercritical fluid-pressure modulation technique. An example of supercritical drying of organic aerogel can also be found in U.S. Pat. No. 5,962,539, which discloses a process and equipment for drying a polymeric aerogel in the presence of a supercritical fluid.

Although silica aerogels demonstrate many unusual and useful properties, they are inherently fragile, brittle, and hydrophilic. There have been several attempts at overcoming weakness and brittleness issues in silica aerogels. Development of the flexible fiber-reinforced silica aerogel composite blanket is one of the promising approaches. For example, U.S. Pat. No. 6,068,882 discloses forming aerogels interstitially within a fiber matrix. However, for certain applications requiring durability under dynamic use conditions such as in spacesuits, the silica aerogel blankets still exhibit durability problems related to dust generation and thermal performance degradation due to the fragile nature of the aerogel. Organically-treated silica aerogels demonstrate much improved impact and flexural strength. More details on such hybrid silica aerogels obtained by co-polymerization with an organic compound can be found in the following references: Leventis et al, "Nanoengineering Strong Silica Aerogels", Nano Letters, 2, 957, (2002), and Zhang et al, "Isocyanate cross-linked silica, structurally strong aerogels" Polymer Preprint, 44, 35 (2003). However, these materials are still very brittle (i.e., not less fragile) and generate dust. More flexible aerogels than silica aerogels have been reported, and are referred to as organically-modified silica aerogel, or Ormosil, by Schmidt H., "New type of non-crystalline solids between inorganic and organic materials", J Non-Cryst. Solids, 73, 681 (1985), or as Aeromosil by Kramer et al., "Organically Modified Silicate Aerogel, Aeromosil" Mat. Res. Soc. Symp. Proc. 435, 295 (1996). However, these are still weak, generate dust when handled, and are not durable due to the inherently fragile nature of the predominant silica aerogel matrix.

The unique porous nanostructure was also reported in organic and carbon based aerogels. A good description for organic aerogels can be found in Pekala and Schaefer, "Structure of organic aerogels. 1. Morphology and Scaling", Macromolecules 26, 5487 (1993). Kistler first prepared organic aerogels based on natural products and their derivatives. Pekala and co-workers developed several organic aerogels. More details can be found in the following references: Polym. Preprints, 29, 204 (1988), Polym. Preprints 30, 221 (1989), U.S. Pat. Nos. 4,873,218, 4,997,804, U.S. Pat. Nos. 5,081, 163, 5,086,085, U.S. Pat. No. 5,476,878. Biesmans et al. describes polyurethane aerogels, and/or their pyrolyzed carbon-aerogel counterparts. Details on this can be obtained from the following references: Biesmans et al., "Polyurethane based organic aerogels' thermal performance" J Non-Cryst. Solids, 225, 36 (1998), Biesmans et al., "Polyurethane based organic aerogels and their transformation into carbon aerogels" J Non-Cryst. Solids, 225, 64 (1998), and Rigacci A., et al., "Preparation of polyurethane-based aerogels and xerogels for thermal superinsulation", J Non-Cryst. Solids, 350, 372 (2004). U.S. Pat. Nos. 5,478,867, 5,484,818, 5,942, 553, 5,869,545, and 5,990,184 describe polyisocyanurate-based organic xerogels and aerogels and their preparation methods. However, since these polyisocyanurate or polyurethane based materials were mostly tailored for xerogels or highly crosslinkable systems and constituent components suitable for carbon aerogel and vacuum panel applications, they are very brittle and stiff. Also, such polyisocyanurate or polyurethane based aerogel system is slowly gelled at ambient conditions, which is a major economic disadvantage in production. In addition, polyurethane based aerogels previously described show high thermal conductivity values. Recently, a very strong and less fragile organic aerogel was introduced, and more details can be obtained from following references, Tan et al, "Organic Aerogels with Very High Impact Strength" Advanced. Materials, 13, 644 (2001) and Zhang G. et al., "Isocyanate-crosslinked silica aerogel monoliths: preparation and characterization", J Non-Cryst. Solids, 350, 152 (2004). Although they significantly improved mechanical properties and obtained less fragile aerogels, they were still very rigid and brittle when compared with the materials of the present inventions. These materials would not be suitable for certain applications requiring exceptional flexibility and durability, such as spacesuit, military and civilian apparels, tents, shoes, and gloves.

Dicyclopentadiene (DCPD), produced by heating crude oil products, results from a facile Diels-Alder dimerization of cyclopentadiene (CP monomer). The main interest in the DCPD monomer is that it can be used to produce a range of different macromolecular architectures, from purely linear to highly cross-linked polymers. DCPD is also an economically interesting monomer since it is a byproduct in the petrochemical industry such as ethylene manufacture and thus, is cheap and readily available. Poly DCPD has been used, to produce many products, ranging from high quality optical lenses to flame retardants for plastics, hot melt adhesives, and other injection molding products. Other applications include uses as a chemical intermediate in the manufacture of insecticides, a hardener and dryer in linseed and soybean oil, and in the production of several polymeric systems such as ethylene propylene diene monomer (EPDM) and elastomers as a co-monomer, metallocenes, varnishes, and paints. DCPD resins have been formulated to make tough thermoset materials via Ring Opening Metathesis Polymerization (ROMP) reactions, examples of which can be found in U.S. Pat. No. 4,400,340, U.S. Pat. No. 4,469,809, and U.S. Pat. No. 6,020,443. Poly-DCPD produced via the ROMP reaction may be post cured to increase the degree of the cross-linking of the polyDCPD material. PolyDCPD is a tough, rigid and low-cost thermoset polymer with excellent mechanical, chemical and physical properties such as: high modulus, low viscosities, extraordinary tensile and impact strength, good physical and mechanical durability at lower temperatures, excellent chemical resistance, and excellent hydrophobicity. In addition, the polymer surface and network can be easily chemically modified via reaction with the many pendant unsaturated double bonds resulting from the ROMP reaction.

PolyDCPD based aerogel monoliths and composites (including fiber-reinforced composites and hybrid material composites) have not been described before. The present invention relates to PolyDCPD based aerogel monoliths and composites, methods for their preparation and applications.

SUMMARY OF THE INVENTION

The present invention relates to porous polyolefin based compositions obtained by performing the steps of: (1) preparing a polyolefin by mixing an olefin monomer, a polymerization catalyst and at least one solvent, (2) maintaining the mixture at a quiescent state at a suitable temperature until the mixture forms a gel and (3) removing the solvent to from the gel thereby substantially maintaining the porous structure.

In certain aspects, the invention provides a microporous article composed of a cross-linked polymer wherein the cross-linked polymer is formed by metathesis polymerization of at least one monomer selected from the group consisting of (a) polycyclic olefins having two or more rings and two or more carbon-carbon double bonds, (b) acyclic polyolefins having three or more unconjugated carbon-carbon multiple bonds, and (c) cycloolefins substituted with one or more unconjugated alkene residues.

In certain other aspects, the invention provides a microporous polydicyclopentadiene based composition prepared form the steps comprising: (a) mixing at least one olefin feedstock comprising at least one dicyclopentadiene monomer, a metathesis polymerization catalyst and at least one solvent to form a mixture; (b) maintaining the mixture in a quiescent state at a temperature suitable for gel formation until the mixture forms a gel, and (c) drying said gel thereby obtaining a microporous material.

In certain aspects, the present invention relates to microporous polyDCPD based aerogel monoliths and composites, and methods for their preparation comprising the steps of: (1) mixing DCPD monomers, a catalyst and suitable solvents, (2) gelation via a ROMP reaction, (3) aging, and (4) supercritically drying. During a fast supercritical drying process the gel can shrink leading to a substantial increase in density of the resulting aerogel. Optionally, IR opacifiers, organic and inorganic reinforcement, and/or organic and inorganic additives are further added in the above mixture during mixing step or prior aging to mitigate pore collapse. Also optional, is post curing of microporous polyDCPD based aerogel monoliths and composites at elevated temperatures under air or inert gas to increase the degree of cross-linking.

The invention further provides methods of preparing a microporous polyolefin based material comprising the steps of: (a) mixing at least one olefin feedstock comprising at least one dicyclopentadiene monomer, at least one solvent, and at least one metathesis polymerization catalyst; (b) maintaining the mixture at a quiescent state for a time period and at a temperature conducive to forming a gel, and (c) drying said gel thereby obtaining a porous material.

The microporous polyolefin and polyDCPD based aerogels described contain an open-pore structure and low density. Aerogels provided herein are inexpensive to prepare, possess desirable thermal, mechanical, acoustic, chemical, and physical properties and are hydrophobic. The aerogels provided herein are suitable for use in various applications, including but not limited to thermal and acoustic insulation, radiation shielding, and vibrational damping applications.

DETAILED DESCRIPTION OF THE INVENTION

The disclosed invention relates to microporous polyolefin based materials prepared via an olefin polymerization reaction followed by gelation and subsequent drying. The invention further relates to polyolefin based aerogel monoliths and composites formed by ring-opening metathesis polymerization of an olefinic monomer having two or more cycloalkene reactive groups. Poly(dicyclopentadiene), "polyDCPD," based aerogel monoliths and composites, methods for preparing same, and methods of using same are provided.

The polyolefin and poly(DCPD) aerogels are prepared by a process comprising the steps of (1) forming a polyolefin or poly(DCPD) gel by ring-opening metathesis polymerization (ROMP) of an appropriate polyolefin feedstock and (2) subsequent drying of the gel, preferably under supercritical conditions, to form the aerogel.

Preparation of these microporous materials involves: (1) mixing at least one polyolefin monomer, an olefin polymerization catalyst, and at least one suitable solvent; (2) maintaining the mixture at a quiescent state at a suitable temperature until a gel forms; and (3) drying the gel by removing the solvent thereby producing a porous material.

In certain aspects, the invention provides a microporous article composed of a cross-linked polymer wherein the cross-linked polymer is formed by metathesis polymerization of at least one monomer selected from the group consisting of (a) polycyclic olefins having two or more rings and two or more carbon-carbon double bonds, (b) acyclic polyolefins having three or more unconjugated carbon-carbon multiple bonds, and (c) cycloolefins substituted with one or more unconjugated alkene residues.

In certain microporous articles, the cross-linked polymer is formed by ring-opening metathesis polymerization (ROMP) of at least one polycyclic olefin having (i) two or more rings which are fused, spiro, or joined in a cage ring system and (ii) two or more carbon-carbon double bonds wherein each ring has zero or one carbon-carbon double bond.

In certain other microporous articles, the polycyclic olefin is selected from dicyclopentadiene, and monomers of any one of the formulae:

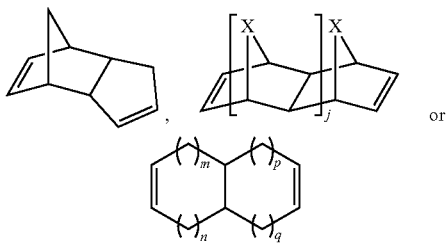

wherein X is $CH_2$ or oxygen;
j is 0, 1, 2, or 3;
m, n, p, q are independently selected from integers 0, 1, 2, 3, or 4 such that $0 \leq (m+n) \leq 1$ or $3 \leq (m+n) \leq 4$ and $0 \leq (p+q) \leq 1$ or $3(\leq p+q) \leq 4$; and wherein each polycyclic olefin is unsubstituted or substituted with 0 to 6 substituents selected from $C_1$-$C_6$alkyl, $C_1$-$C_6$haloalkyl, $C_2$-$C_6$alkenyl, $C_2$-$C_6$alkynyl, halogen, $C_1$-$C_6$alkoxy, $C_1$-$C_6$alkanoyl, and $C_1$-$C_6$carboxyalkyl.

In still other microporous articles, the polycyclic olefin is unsubstituted or substituted norbornadiene or dicyclopentadiene substituted with 0 to 4 $C_1$-$C_4$alkyl groups. In still other microporous articles the polycyclic olefin is dicyclopentadiene.

In certain other aspects of the invention, the microporous article comprises a crosslinked polymer formed by acyclic diene metathesis polymerization (ADMET) of at least one acyclic polyolefin having a three or more carbon-carbon double bonds. For microporous articles prepared by ADMET, the carbon-carbon double bonds of the polyolefin are separated from the remaining carbon-carbon double bonds by at least six (6) intervening atoms.

In certain microporous articles, the cross-linked polymer has between about 0.0001% and 5% by weight, or between about 0.0005% and about 2.5% or between about 0.001% and about 1% of a transition metal dispersed therein. In certain articles the transition metal dispersed in the cross-linked polymer is selected from niobium, tantalum, chromium, molybdenum, tungsten, rhenium, iron, ruthenium, osmium, or a mixture thereof. In certain other articles the transition metal dispersed in the cross-linked polymer is selected from molybdenum, tungsten, rhenium, ruthenium, or osmium.

In yet other microporous articles provided by the invention the article is composed of a composite comprising a microporous cross-linked polymer and at least one reinforcement material selected from the group consisting of fibers, fibrous batting, particles and combinations thereof.

Still other microporous articles including monolithic microporous articles (e.g., articles without a reinforcement materials disbursed therein) and composite microporous articles further comprise one or more additional additives selected from the group consisting of IR opacifiers, antioxidants, flame retardant agents, organic or inorganic fillers, crosslinking agents, elastomers, binders, plasticizers, pigments, dyes and combination thereof.

In yet another aspect of the invention, a microporous polydicyclopentadiene based composition is provided which is prepared by a process comprising the steps of: (a) mixing at least one olefin feedstock comprising at least one dicyclopentadiene monomer, a metathesis polymerization catalyst and at least one solvent to form a mixture; (b) maintaining the mixture in a quiescent state at a temperature suitable for gel formation until the mixture forms a gel, and (c) drying said gel thereby obtaining a microporous material.

Certain methods of preparing the microporous polydicyclopentadiene based composition include methods in which the drying is carried out under supercritical conditions.

Certain other microporous polydicyclopentadiene based compositions are prepared by methods in which the a gel is prepared by ring-opening metathesis polymerization of the dicyclopentadiene monomer. Still other microporous polydicyclopentadiene based compositions are prepared by ring-opening metathesis polymerization of the dicyclopentadiene monomer under conditions conducive to crosslinking of at least a portion of poly(dicyclopentadiene) chains. Certain conditions conducive to crosslinking of the polydicyclopentadiene resin of the microporous polydicyclopentadiene based composition include heating the article before or after drying under either air or inert gas.

Yet other microporous dicyclopentadiene based compositions are prepared by methods in which the olefin feedstock comprising at least one dicyclopentadiene monomer comprises more than about 60% dicyclopentadiene monomer by weight. Certain other microporous dicyclopentadiene based compositions are prepared by methods in which the olefin feedstock comprising at least one dicyclopentadiene monomer comprises more than about 70%, 80%, 90%, 95%, or 99% dicyclopentadiene monomer by weight.

In certain microporous articles, the cross-linked polymer has between about 0.0001% and 5% by weight, or between about 0.0005% and about 2.5% or between about 0.001% and about 1% of a transition metal dispersed therein. In certain articles the transition metal dispersed in the cross-linked polymer is selected from niobium, tantalum, chromium, molybdenum, tungsten, rhenium, iron, ruthenium, osmium, or a mixture thereof. In certain other articles the transition metal dispersed in the cross-linked polymer is selected from molybdenum, tungsten, rhenium, ruthenium, or osmium.

In yet other microporous polydicyclopentadiene based embodiments, the articles are prepared by methods in which at least one reinforcement material is incorporated into the mixture prior to step (b). Although any reinforcement material may be used, fibers, fibrous batting, particles and combinations thereof are particularly suitable for the microporous polydicyclopentadiene based compositions prepared by the recited methods.

Still other microporous articles including monolithic microporous articles (e.g., articles without a reinforcement materials dispersed therein) and composite microporous articles prepared by the recited process steps further comprise one or more additional additives selected from the group consisting of IR opacifiers, antioxidants, flame retardant agents, organic or inorganic fillers, crosslinking agents, elastomers, binders, plasticizers, pigments, dyes and combination thereof. The additional additives may be incorporated at any time during the process or are incorporated into the mixture before during or after the polymerization process of step (a), before aging the reaction mixture of step (b) or after drying in step (c).

In other aspects, the invention provides a method of preparing a microporous polyolefin based material comprising the steps of: (a) mixing at least one olefin feedstock comprising at least one dicyclopentadiene monomer, at least one solvent, and at least one metathesis polymerization catalyst, (b) maintaining the mixture at a quiescent state for a time period and at a temperature conducive to forming a gel, and (c) drying said gel thereby obtaining a porous material. Certain microporous polyolefin materials prepared by the recited methods include aerogels and xerogels. Certain other microporous polyolefin materials, including polyolefin aerogels are prepared by methods which includes drying under supercritical conditions.

Certain other methods of preparing a microporous polyolefin based material provided herein include methods in which the a gel is prepared by ring-opening metathesis polymerization of the dicyclopentadiene monomer. Still other methods of preparing a microporous polyolefin based material include ring-opening metathesis polymerization of the polyolefin or dicyclopentadiene monomer under conditions conducive to crosslinking of at least a portion of poly(dicyclopentadiene) chains. Certain conditions conducive to crosslinking of the polydicyclopentadiene resin of the microporous polydicyclopentadiene based composition include heating the article before or after drying under either air or inert gas.

Yet other methods of preparing a microporous polyolefin based material include the use of an olefin feedstock comprising at least one dicyclopentadiene monomer comprises more than about 60% dicyclopentadiene monomer by weight. Certain other suitable olefin feedstocks comprise more than about 70%, 80%, 90%, 95%, or 99% dicyclopentadiene monomer by weight.

In certain aspects, preparation of microporous polyDCPD based aerogel monoliths and composites, comprises the following steps: (1) mixing at least one polyDCPD monomer, a ROMP catalyst, and at least one suitable solvent, (2) maintaining a mixture in a quiescent state at either room or elevated temperature for a period of time until mixed sol forms a polymeric wet gel via ROMP reaction, (3) aging at an elevated temperature for a period of time until the weak wet gel becomes strengthened, (4) removing the solvent under supercritical conditions to prepare microporous aerogel monoliths and composites, and optionally (5) post curing the obtained microporous polyDCPD based aerogel at elevated temperatures under ambient air or inert gas atmosphere to increase the degree of cross-linking. In order to further improve the reactivity, performance, structural integrity, or handling of the present invention, inorganic and organic additives or reinforced materials including IR opacifiers, flame retardant agents, and crosslinking agents can be mixed with the other ingredients in sol-gel process of step (1).

Dicyclopentadiene monomers (e.g., DCPD monomers) which are suitable for use in the methods of the invention and in the preparation of the microporous articles of the invention include dicyclopentadiene, substituted dicyclopentadiene, and partially polymerized dicyclopentadiene resins. In certain applications, dicyclopentadiene, dicyclopentadiene substituted with 1, 2, 3, or 4 methyl groups, or ROMP polymerized dicyclopentadiene having a molecular weight of less than about 10,000 are preferred DCPD monomers. In certain other applications dicyclopentadiene is a preferred DCPD monomer.

Both the endo and exo isomers (and mixtures thereof) of DCPD monomers are suitable for use in the present invention. The preferred DCPD monomers may be endo isomers. The DCPD monomers for use in the present invention include dicyclopentadiene ($C_{10}H_{12}$), Diels-Alder heterodimers of cyclopentadiene and an alkylated cyclopentadiene (e.g., a cyclopentadiene having one, two or three alkyl substituents such as methylcyclopentadiene, ethylcyclopentadiene, dimethylcyclopentadienes and the like), and Diels-Alder homodimers of alkylated cyclopentadienes such as di(methylcyclopentadiene, $C_{12}H_{16}$), and mixtures thereof. Suitable DCPD monomers may also contain impurities such as water, alcohols, aromatic or non-aromatic organic species and inorganic species. More specifically, examples of impurities that may be present include water, alcohols, C5 and C6 cracking fractions, benzene, toluene, cyclopentadiene, and C-9, C-10 and C-11 codimers. Additionally, the DCPD starting materials may include trimers and higher oligomers of DCPD.

In another preferred embodiment, the DCPD monomers for use in the present invention can in certain aspects be functionalized DCPD monomers. That is, the DCPD monomers in certain applications may be partially substituted with a variety of functional groups including hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogens. In certain aspects, the microporous poly(DCPD) or poly(DCPD) aerogel is prepared by ROMP polymerization of one or more functionalized DCPD monomers. For example, the functionalized DCPD monomers may include one or more functional groups such as hydroxyl, thiol, ketone, aldehyde, ester, ether, amine, amide, nitro acid, carboxylic acid, disulfide, carbonate, carboalkoxy acid, isocyanate, carbodiimide, carboalkoxy, and halogen.

The purity of the DCPD monomer is not critical to the practicing the invention. Ring-opening metathesis polymerization of high and low purity dicyclopentadiene monomers have been reported previously. For example, low purity dicyclopentadiene polymerization with ruthenium carbenes is reported in U.S. Pat. No. 6,020,443. Although not wishing to be bound by theory, the instant invention provides aerogel or microporous products which are generated by polymerizing a precursor monomer at a concentration corresponding to a target theoretical density. Olefin monomers such as DCPD monomers of various purities can be used in the methods of the invention by controlling the final concentration of the olefin or DCPD monomer in the polymerization reaction mixture. Although lower purity olefin precursors may be used in the methods of the invention, higher purity DCPD resins are generally preferred.

In certain aspects preferred DCPD monomers for use in the present invention contain at least about 70% DCPD monomer by weight, more preferably greater than 80%. For example, these high purity DCPD resins are commercially available under the trademark by UPR grade (containing DCPD monomer about 84% from Chevron Phillips Chemical Com.), under the trademark by Polyester grade (containing DCPD monomer about 84% from Texmark, Inc.), under the trademark by Petroplast® 94 (containing DCPD monomer about 94% from Shell Chemicals Ltd.), under the trademark by Ultrene® 97 (containing DCPD monomer about 97% purity from Cymetech LLC), and Ultrene® 99 (containing DCPD monomer about 99% purity from Cymetech LLC). Mixtures of these DCPD resins can be used.

The DCPD monomers for use in the present invention is used in amounts ranging from about 0.1 to about 60% by weight of the polymerization reaction mixture (e.g., the admixture of DCPD monomer, solvent, catalyst, and any optional additives or reinforcement material). In certain aspects, the DCPD monomer is from about 0.5 to about 55% by weight of the polymerization reaction mixture, or from about 1 to about 50% by weight of the polymerization reaction mixture depending on the desired final properties of the product microporous material or aerogel.

The DCPD monomers may optionally be refluxed, filtered, and degassed before the catalyst is added, although none of these procedures is necessary to practice the invention. In certain aspects, it is preferable to avoid cracking the DCPD monomer into constituent cyclopentadiene fragments. For applications where it would be desirable to reflux, distill or otherwise heat the DCPD monomer to a temperature at which a retro Diels-Alder occurs, it is preferable to maintain the DCPD monomer at a temperature conducive to dimerization of cyclopentadiene prior to addition of the metathesis catalyst.

Although DCPD monomers are described as the best mode of the present invention, other monomers can also serve the same purpose. Such monomers can be described as olefins preferably with a ring structure and capable of undergoing polymerization reactions in presence of the catalysts presently described. More preferably these ring structures are strained. Also preferably an additional unsaturation such as an ethylene functionality is present such that an additional polymerization reaction further cross links the three dimensional network.

In certain aspects, non-DCPD monomers include strained polycyclic polyolefins having two or more ring carbon-carbon bonds which are part of 4, 5, or 8 membered rings or carbon-carbon bonds which are part of a caged ring system. Certain non-DCPD monomers which are suitable for use in the microporous polyolefin materials and methods of making same include polyolefins of the formulae:

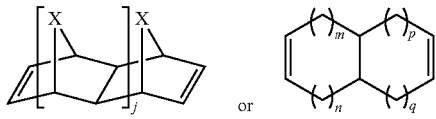

wherein X is $CH_2$ or oxygen;
j is 0, 1, 2, or 3;
m, n, p, q are independently selected from integers 0, 1, 2, 3, or 4 such that $0 \leq (m+n) \leq 1$ or $3 \leq (m+n) \leq 4$ and $0 \leq (p+q) \leq 1$ or $3 \leq (p+q) \leq 4$; and wherein each polycyclic olefin is unsubstituted or substituted with 0 to 6 substituents selected from $C_1$-$C_6$alkyl, $C_1$-$C_6$haloalkyl, $C_2$-$C_6$alkenyl, $C_2$-$C_6$alkynyl, halogen, $C_1$-$C_6$alkoxy, $C_1$-$C_6$alkanoyl, and $C_1$-$C_6$carboxyalkyl.

Catalysts for carrying out polyolefin polymerization reactions are well known in the art. Certain preferred metathesis catalysts and metathesis polymerization catalysts include catalysts capable of ring-opening metathesis polymerization of at least one cycloalkene monomer. In certain aspects, the ROMP catalyst is selected from the group consisting of ruthenium alkylidene complexes, osmium alkylidene complexes, molybdenum alkylidene complexes and tungsten alkylidene complexes, and combinations thereof.

For non-limiting examples of catalyst compositions used in different embodiments of the present invention and their preparation methods, see U.S. Pat. Nos. 5,637,660, 5,840, 646, 5,852,146, 6,034,190, and 4,463,102. For metathesis reactions, a variety of catalysts are commercially available from companies such as Materia Inc. (Pasadena, Calif.), Strem Chemicals (Newburyport, Mass.), and Sigma-Aldrich (Milwaukee, Wis.). In certain aspects, the catalyst is selected from those catalysts known in the prior art to promote ROMP of DCPD monomer including Ziegler type catalysts formed by the reaction of an early transition metal halide with a reducing agent such as an alkyl aluminum halide (Lindmark-Hamberg, Wagner, K. B., Macromolecules 20, 2949-2951 (1987)). So-called "Schrock catalysts" such as tungsten and molybdenum alkylidenes and metalocyclobutanes (Schrock, R. R., Cho, H. N., Gibson, V. C., Macromolecules 24, 4495-4502 (1991) and Schrock, R. R. and Hoveyda, A. H., Angewandte Chimie, International Edition, 42, 4592-4633 (2003)), and Grubbs catalysts such as ruthenium and osmium carbene or alkylidene complexes (Grubbs, R. H., Chang, S., Tetrahedron 54, 4413-4450 (1998)) are also applicable to the present invention. The preferred catalyst should have a good tolerance for a wide range of impurities and functional groups including oxygen, water, and alcohol, which can economically and conveniently produce polyDCPD material without requiring special facilities. In certain applications, Grubbs type ruthenium or osmium catalysts are particularly suitable for use in the methods provided herein. These Grubbs type ROMP catalysts are commercially available from Ciba Specialty Chemicals, Cymetech LLC, Umicore and Materia Corp.

The amount of catalyst for use in the present invention depends on the amount of DCPD monomer used for the desired target density, the reaction temperature, solvent type, the amount of solvent, and the amount of organic and inorganic additives incorporated (such as reinforcement materials, opacifiers, antioxidants, flame retardants, and post curing agents). The amount of catalyst for the present invention is preferably used in the ratio between the catalyst and the total solid weight including DCPD monomer and organic and inorganic additives incorporated. The preferred ratio between the catalyst and the total solid weight is about 1:100 (1 wt %) and 1:20000 (0.005 wt %). If the ratio between the catalyst and the total solid weight of less than 1:20000 is used, the polyDCPD wet gels are very weak, and cannot withstand deformation during supercritical drying. The invention may be practiced with the ratios between the catalyst and the total solid outside of the above range depending on the temperature, time period during gelation and aging, rate of drying, and incorporation of reinforcement materials into the sol prior to gelation.

Certain microporous polyolefin and microporous poly(D-CPD) materials are prepared by ROMP of the corresponding monomer with a ROMP catalyst of the formula $(L)_i(X)_2M(CR_1R_2)$, referred to herein as ROMP catalysts of Formula I, wherein M is ruthenium or osmium; L is a neutral electron donor ligand, which is independently selected at each occurrence of L; X is an anionic ligand, which is independently selected at each occurrence of X; $R_1$ and $R_2$ are independently selected from hydrogen and residues selected from the group consisting of $C_1$-$C_8$alkyl, $C_2$-$C_8$alkenyl, $C_2$-$C_8$alkynyl, $C_3$-$C_8$cycloalkyl, 4 to 8 membered heterocycles, and aryl, each of which is substituted with 0 to 5 substituents independently selected from the group consisting of $C_1$-$C_8$alkyl, $C_2$-$C_8$alkenyl, $C_2$-$C_8$alkynyl, $C_3$-$C_8$cycloalkyl, $C_1$-$C_8$alkoxy, $C_2$-$C_8$alkenyloxy, $C_2$-$C_8$alkynyloxy, $C_1$-$C_8$alkylthio, $C_1$-$C_8$alkylsulfonyl, $C_1$-$C_8$alkylsulfinyl, $C_1$-$C_8$alkanoyl, $C_1$-$C_8$alkoxycarbonyl, $C_1$-$C_8$alkanoyloxy, mono- and di-$C_1$-$C_8$alkyl amino, and phenyl; and i is 1 or 2. In certain other ROMP catalysts of the formula $(L)_i(X)_2M(CR_1R_2)$ include those in which L is independently selected at each occurrence from tertiary phosphines and N-heterocyclic carbenes.

In yet other ROMP catalysts of Formula I, L is independently selected at each occurrence from tri($C_5$-$C_7$cycloalkyl) phosphine and heterocyclic carbenes of the formula:

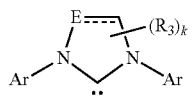

wherein E is N, $CR_3$, or $C(R_3)_2$;

k is an integer of from 0 to 4;

$R_3$ is independently selected at each occurrence from the group consisting of hydrogen, $C_1$-$C_6$alkyl, $C_1$-$C_6$alkoxy, $C_3$-$C_8$cycloalkyl, phenyl, or two $R_3$ taken in combination form a 4-8 membered carbocycle or heterocycle; and Ar is independently selected at each occurrence from aryl and heteroaryl substituted with 0-5 substituents selected from halogen, $C_1$-$C_6$alkyl and $C_1$-$C_6$alkoxy.

In certain ROMP catalysts of the Formula I, $R_1$ is hydrogen, and $R_2$ is selected from hydrogen, $C_1$-$C_6$alkyl, $C_2$-$C_6$alkenyl, $C_3$-$C_8$cycloalkyl, and phenyl, each of which non-hydrogen residues is substituted with 0-3 groups selected from halogen, $C_1$-$C_4$alkyl, and $C_1$-$C_4$alkoxy. In certain aspects, $CR_1R_2$ is a phenylmethylene (also referred to herein as a "benzylidene" residue) which is optionally substituted with 0, 1, 2, or 3 halogen, $C_1$-$C_4$alkyl, or $C_1$-$C_4$alkoxy groups.

In certain other aspects, the ROMP catalysts are selected from ruthenium alkylidene complexes of the formula $L_nX_2Ru(CR_1R_2)$, referred to herein as ROMP catalysts of Formula II wherein L is independently selected at each occurrence from neutral two-electron donor ligands; n is 1 or 2; X is independently selected at each occurrence to be a halogen, a $C_1$-$C_6$alkoxy residue or an aryloxy residue; $R_1$ and $R_2$ are independently selected from hydrogen, $C_1$-$C_6$alkyl, $C_2$-$C_6$alkenyl, aryl, $C_3$-$C_8$cycloalkyl, or $CR_1R_2$, taken in combination form a carbocyclic or heterocyclic ring system having between 1 and 3 rings, each of which has between 3 and 7 ring atoms.

In certain ROMP catalysts of Formula II, X is chloro; and L is a phosphine or a substituted heterocyclic carbene having 2 or 3 ring nitrogens and 2, 3, or 4 substituents selected from $C_1$-$C_6$alkyl, phenyl substituted with 0-4 $C_1$-$C_6$alkyl groups, or two substituents taken in combination form a ring fused to the heterocyclic carbene ring.

In certain other ROMP catalysts of Formula II, X is chloro; $R_1$ is hydrogen; $R_2$ is phenyl substituted with 0, 1, or 2 halogen or $C_1$-$C_4$alkoxy groups; n is 2; and L is independently selected at each occurrence from tri($C_1$-$C_6$alkyl)phosphine, tri($C_5$-$C_7$cycloalkyl)phosphine, 1,3-diarylsubstituted imidazolidinyl, 1,3-diarylsubstituted 2,3-dihydro imidazolyl, or 1,3-diarylsubstituted triazolidinyl.

In yet other ROMP catalysts of Formula II, X is chloro; $R_1$ is hydrogen; $R_2$ is 2-$C_1$-$C_6$alkoxyphenyl; n is 1; and L is independently selected at each occurrence from tri($C_1$-$C_6$alkyl)phosphine, tri($C_5$-$C_7$cycloalkyl)phosphine, 1,3-diarylsubstituted imidazolidinyl, 1,3-diarylsubstituted 2,3-dihydro imidazolyl, or 1,3-diarylsubstituted triazolidinyl.

Certain preferred commercially available ruthenium alkylidene ROMP catalysts which are suitable for use in the compositions and methods provided herein include:

Dichloro(phenylmethylene)bis(tricyclohexylphosphine) ruthenium (Sold by Sigma-Aldrich, Milwaukee, Wis.);

[1,3-Bis-(2,4,6-trimethylhenyl)-2-imidazolidinylidene] dichloro(phenylmethylene) (tricyclohexylphosphine)ruthenium (Sold by Sigma-Aldrich, Milwaukee, Wis.);

Dichloro{[2-(1-methyl-ethoxy)phenyl]methylene}(tricyclohexylphosphine)ruthenium (Sold by Sigma-Aldrich, Milwaukee, Wis.);

[1,3-Bis-(2,4,6-trimethylhenyl)-2-imidazolidinylidene] dichloro{[2-(1-methyl-ethoxy)phenyl] methylene}ruthenium (Sold by Sigma-Aldrich, Milwaukee, Wis.);

Bis(tricyclohexylphosphine)-3-phenyl-1H-inden-1-ylideneruthenium (II) dichloride (Neolyst™; Sold by Strem Chemical, Newburyport, Mass.);

Bis(tricyclohexylphosphine)[(phenylthio)methylene]ruthenium (II) dichloride (Sold by Strem Chemical, Newburyport, Mass.);

Dichloro(3-methyl-2-butenylidene)bis(tricyclohexylphosphine)ruthenium(II) (Sold by Sigma-Aldrich, Milwaukee, Wis.); and Dichloro(3-methyl-2-butenylidene)bis(tricyclopentylphosphine)ruthenium(II) (Sold by Sigma-Aldrich, Milwaukee, Wis.).

In certain other aspects, ruthenium alkylidene catalysts or osmium alkylidene catalysts recited in any one of U.S. Pat. Nos. 6,838,489, 6,284,852, 6,486,279, 6,610,626, 6,635,768, 6,818,586, 6,759,537, 6,465,554, 6,426,419, 6,642,265, 5,831,108, 6,111,121, and 5,917,071, the disclosure of each of which is incorporated herein in the entirety.

Certain other ruthenium alkylidene catalysts which are suitable for use in the microporous polyolefin materials of the invention include the use of a pre-polymerized dicyclopentadiene resin comprising a still active ruthenium alkylidene complex. That is, in certain aspects the ROMP catalysts is a complex of the formula $(L)_i(X)_2Ru(CR_1R_2)$ wherein L, X, and $R_2$ are defined as provided in catalysts of Formula I or Formula II supra and $R_2$ is a ROMP polymer such as a ROMP poly(DCPD). In certain applications when the ROMP catalyst is part of a pre-polymerized dicyclopentadiene resin, the resin typically comprises between about 1% and about 10% ruthenium alkylidene complex by weight.

The solvent for use in the present invention should be non-reactive with the initial DCPD monomers, the 3 dimensionally polymerized polyDCPD gels, and/or the catalyst. In certain aspects, the solvent should also form a homogeneous solution with the unreacted monomers and reaction products. In certain other aspects, the solvent should prevent precipitation of the polymerized resin from solution and prevent phase separation of reaction products. Certain solvents which are suitable for use in the methods recited herein include hydrocarbons, ethers (including alkyl ethers, alkyl aryl ethers and diaryl ethers), cyclic ethers, ketones, alkyl alkanoates (such as methyl acetate, ethyl acetate, ethyl lactate, and the like), aliphatic and cycloaliphatic hydrofluorocarbons, hydrochlorocarbons, chlorofluorocarbons, halogenated aromatics, (per)fluorinated ethers, alcohols of lower molecular weight, and water. In certain applications, the use of a solvent mixture is also contemplated, and may in certain applications be desirable.

Suitable hydrocarbon solvents include lower aliphatic or cyclic hydrocarbons such as ethane, propane, n-butane, isobutane, n-pentane, isopentane, cyclopentane, methylcyclopentane, neopentane, hexane, cyclohexane, methylcyclohexane, heptane, cycloheptane, octane, decane, benzene, toluene, xylene, mesitylene and the like.

Suitable dialkyl ethers to be used as solvent include compounds having from 2 to 6 carbon atoms and include dimethyl ether, methyl ethyl ether, diethyl ether, methyl propyl ether, methyl isopropyl ether, ethyl propyl ether, ethyl isopropyl ether, dipropyl ether, propyl isopropyl ether, diisopropyl ether, methyl butyl ether, methyl isobutyl ether, methyl t-butyl ether, ethyl butyl ether, ethyl isobutyl ether and ethyl t-butyl ether. Suitable cyclic ethers include tetrahydrofuran.

Suitable dialkyl ketones to be used as solvent include acetone, cyclohexanone, methyl t-butyl ketone and methyl ethyl ketone, methyl isopropyl ketone.

Suitable alkyl alkanoates which may be used as solvent include methyl formate, methyl acetate, ethyl formate, butylacetate, ethyl acetate, and ethyl lactate.

Suitable hydrofluorocarbons which may be used as solvent include lower hydrofluoroalkanes, for example difluoromethane, 1,2-difluoroethane, 1,1,1,4,4,4-hexafluorobutane, pentafluoroethane, 1,1,1,2-tetrafluoroethane, 1,1,2,2-tetrafluoroethane, pentafluorobutane and its isomers, tetrafluoropropane and its isomers and pentafluoropropane and its isomers. Substantially fluorinated or perfluorinated (cyclo)alkanes having 2 to 10 carbon atoms can also be used. Suitable hydrochlorofluorocarbons which may be used as solvent include chlorodifluoromethane, 1,1-dichloro-2,2,2-trifluoroethane, 1,1-dichloro-1-fluoroethane, 1-chloro-1,1-difluoroethane, 1-chloro-2-fluoroethane and 1,1,1,2-tetrafluoro-2-chloroethane.

Suitable chlorofluorocarbons which may be used as solvent include trichlorofluoromethane, dichlorodifluoromethane, trichlorotrifluoroethane and tetrafluorodichloroethane.

Suitable hydrochlorocarbons which may be used as solvent include 1- and 2-chloropropane and dichloromethane.

Suitable halogenated aromatics include monochlorobenzene and dichlorobenzene.

Suitable (per) fluorinated ethers which may be used as solvent include bis-(trifluoromethyl)ether, trifluoromethyl difluoromethyl ether, methyl fluoromethyl ether, methyl trifluoromethyl ether, bis-(difluoromethyl)ether, fluoromethyl difluoromethyl ether, methyl difluoromethyl ether, bis-(fluoromethyl)ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether, 1,1,1,3,3,3-hexafluoroprop-2-yl fluoromethyl ether.

Suitable lower molecular weight alcohols include methanol, ethanol, 1-propanol, 2-propanol, 1-butanol, 2-butanol, 1-pentanol, 2-pentanol, 3-pentanol, 1-hexanol, 2-hexanol, 3-hexanol, 1-heptanol, 2-heptanol, 3-heptanol.

Preferred solvents for use in the present invention are hexane, benzene, toluene, xylene, methyl ethyl ketone, methyl isobutyl ketone, acetone, tetrahydrofuran, dichloromethane, 3-methyl-2-butanone, monochlorobenzene, chlorodifluoromethane, 1,1-dichloro-1-fluoroethane, 2-propanol, 1-butanol, ethanol, methanol, water, or the mixtures thereof.

The amount of solvent for use in the present invention depends on the desired density and additives used (such as opacifiers and reinforcement material). The nature and amount of solvent that can be used may be based on the theoretical (or target) density considering that the final density is generally higher than the theoretical density because of shrinkage realized during the aging and supercritical drying steps. The amount of solvent for use in the present invention is used in the present process preferably in such an amount that the target density of polyDCPD based aerogel ranges from 0.01 g/cm$^3$ to 0.5 g/cm$^3$, more preferably from 0.02 g/cm$^3$ to 0.4 g/cm$^3$.

In order to further improve the polymerization reaction, thermal and mechanical properties, the structural integrity, and the handling of the aerogel monoliths or aerogel composites, various additives can be incorporated into the sol-gel process. For example, various organic or inorganic additives or reinforcement materials can be incorporated in the sol-gel process. Typical concentrations of the additives is between about 0.1 and about 50% by weight based on the weight of DCPD monomer or polyolefin monomer. In certain aspects, the additives incorporated into the sol-gel process do not interfere with the polymerization of the DCPD monomer or olefin monomer. That is, preferred additives do not interfere with the metathesis polymerization (e.g. ROMP) of the DCPD monomer or polyolefin monomer. Thus, the organic and inorganic IR opacifiers, other additives, and/or reinforcement materials incorporated in the sol-gel process do not interfere with the ROMP reaction and are capable of being dispersed in polyDCPD based aerogels. In certain aspects, the organic and inorganic IR opacifiers, other additives, and/or reinforcement materials incorporated in the sol-gel process do not interfere with the ROMP reaction and are capable of being uniformly or homogeneously dispersed in polyDCPD based aerogels.

Examples of suitable IR opacifiers and reinforcement materials include carbon black (added as dispersion or dispersed from powder form), carbon fiber, boron fiber, ceramic fiber, rayon fiber, nylon fiber, olefin fiber, alumina fiber, asbestos fiber, zirconia fiber, alumina, clay, mica, silicas, calcium carbonate, titanium dioxide, talc, zinc oxide, barium sulfates, and wood.

Fiber batting materials may be used at the bottom and/or top of the mold in which the monolith is cast to give additional structural strength. Description of such reinforcements is found in published U.S. application 2002/10,094,426 A1 (Stepanian et. al.), the entire contents of which is hereby incorporated by reference. Other methods of preparing fiber-reinforced aerogel materials, which can be practiced with the present invention, can be found in U.S. Pat. No. 5,306,555 (Ramamurthi et al.) and U.S. Pat. No. 5,789,075 (Frank et al.), each of which is hereby incorporated by reference.

In certain aspects, the microporous material or aerogel is a composite material comprising a polymeric component, a fibrous reinforcing material and optional additional ingredients. In certain aspects, a sol or slurry of the olefinic monomer, metathesis catalyst, and any optional additional ingredients is infused into a fibrous batting and allowed to gel. Certain fibrous reinforcing materials include fibrous batting selected from polyester fibers, polyolefin terephthalates, poly (ethylene) naphthalate, polycarbonates and Rayon, Nylon, cotton-based lycra (manufactured by DuPont), carbon-based fibers like graphite, precursors for carbon fibers like polyacrylonitrile(PAN), oxidized PAN, uncarbonized heat-treated PAN (such as the one manufactured by SGL carbon), fiberglass based material like S-glass, 901 glass, 902 glass, 475 glass, E-glass, quartz, Quartzel (manufactured by Saint-Gobain), Q-felt (manufactured by Johns Manville), alumina fibers like Saffil (manufactured by Saffil), Durablanket (manufactured by Unifrax), polyaramid fibers like Kevlar, Nomex, Sontera (all manufactured by DuPont), Conex (manufactured by Teijin), polyolefins like Tyvek (manufactured by DuPont), Dyneema (manufactured by DSM), Spectra (manufactured by Honeywell), polypropylene fibers like Typar and Xavan (both manufactured by DuPont), fluoropolymers like PTFE with trade names such as Teflon (manufactured by DuPont), Goretex (manufactured by GORE), silicon carbide fibers like Nicalon (manufactured by COI Ceramics), Nextel fibers (manufactured by 3M), acrylic fibers, fibers of wool, silk, hemp, leather, suede, PBO-Zylon fibers (manufactured by Tyobo), liquid crystal material like Vectan (manufactured by Hoechst), Cambrelle fiber (manufactured by DuPont), polyurethanes, polyamides, wood fibers, and boron, aluminum, iron, stainless steel fibers, and thermoplastics like PEEK, PES, PEI, PEK, and PPS.

In certain applications where the microporous materials or aerogels including the polyDCPD aerogels are exposed to oxygen and high temperature, it is desirable to incorporate one or more antioxidant into the microporous material or aerogel. Antioxidants can be incorporated in the sol-gel process, preferably in an amount of between 0.1 and 20% by weight based on the weight of polyDCPD resin. Examples of suitable antioxidant materials include phenol-based compounds or phosphorus-based compounds. The commonly known general-purpose phenol-based compound antioxidants, especially commercially available material such as Irganox 259, Irganox 1010, or Irganox 1076 (manufactured by Ciba Specialty Chemicals, Inc) can be used herein. The phosphorus-based compounds are exemplified by the material commercially available under the trademark by Ultranox® 626, Ultranox® 641, or Ultranox® 668 (manufactured by GE Specialty Chemicals). They may be used alone or in combinations of two or more.

In certain aspects, addition of one or more cross-linking agents to the reaction mixture or before gelation may be desirable to initiate additional post curing reaction of the polyDCPD based aerogel products. Some commonly known peroxide crosslinking agents disclosed in U.S. Pat. No. 5,728,785 may be used for the present invention. Examples of the preferred peroxides cross-linking agents include alkyl peroxides, particularly tert-butyl peroxide or di-t-butyl peroxide, 2,5-dimethyl-2,5-di-(tert-butylperoxy)hexyne-3,2,5-dimethyl-2,5-di-(tert-butylperoxy)hexane, dicumyl peroxide, 2,5-dimethyl-2,5-di(t-butylperoxy)hexane, methyl ethyl ketone peroxide, or any mixtures thereof.

Some commonly known flame retardants disclosed in previous U.S. Pat. No. 4,740,537 may be included in the present invention. Such flame retardants include but are not limited to: red phosphorus and a brominated aromatic compound selected from the group comprising of N,N'-ethylene-bis-(tetrabromophthalimide), brominated polystyrene, decabromodiphenyl oxide, tetrabromoxylene, brominated polyphenylene oxide, octabromodiphenyl oxide and tetradecabromodiphenoxy benzene. The red phosphorus and brominated aromatic compounds are solids that contribute flame retardancy to the polyDCPD based aerogel products.

The addition of an elastomer increases the impact strength of polyDCPD based aerogel without extremely decreasing the flexural modulus and excessively increasing the solution viscosity. Suitable elastomers for use in the present invention include natural rubber, butyl rubber, polyisoprene, polybutadiene, polyisobutylene, ethylenepropylene copolymer, styrene-butadiene-styrene triblock rubber, styrene-isoprene-styrene triblock rubber and ethylenepropylene diene terpolymers. The elastomers should be dissolved in DCPD monomer mixture solution to form a homogeneous solution.

Other additives such as binders, plasticizers, pigments, and dyes etc, as are known in the art may optionally be included in DCPD monomer mixture solution.

A total solid content of the reaction mixture is preferably between 0.1 and 60% by weight, more preferably between 1 and 50% by weight.

A solution is made of the DCPD monomers and solvents, and/or organic and inorganic additives incorporated. Subsequently, the catalyst is introduced into the solvent/DCPD monomer mixture. Alternatively, in order to improve mixing efficiency, a solution of the catalyst in the solvent(s) can be added to the solvent/DCPD monomer mixture. Mixing can be preferably done at a temperature between the melting and boiling point of the solvent. In certain methods, a temperature between about −10° C. to about 150° C., or between about 10° C. and about 100° C. is suitable for mixing the solvent, monomer, catalyst and optional additives. In certain other methods, a mixing temperature of about 15° C., about 20° C., about 30° C., about 40° C., about 50° C., about 60° C., about 70° C., about 80° C. about 90° C. or at a temperature range bounded by any two of the preceding temperatures is suitable for mixing the solvent, monomer, catalyst and optional additives.

After combination of the solvent, monomer, catalyst and optional additives, the mixture is left standing for a certain period of time to form a polymeric gel. This time period varies from 30 seconds to several days, even weeks and months, depending on the DCPD monomer content, catalyst type and loading (e.g., the relative concentration of catalyst to monomer), the target density, and/or organic and inorganic additives incorporated. The preferred gelation temperature for the present invention ranges from about 10° C. to about 200° C., more preferably from 20° C. to 150° C. and is preferably lower than the boiling point of the solvent and monomers. Although not wishing to be bound by theory, selecting a gelation temperature less than the boiling point of the solvent and monomers is believed to preserve the pore structure of the wet gel formed via the polymerization reaction. The gelation time for the present invention is preferably between 30 seconds and 24 hours, more preferably from 2 minute to 12 hours in the temperature range from 20° C. to 150° C.

In certain aspects, formation of a more uniform wet gel provides microporous materials and aerogels with superior physical properties. In one aspect, a more uniform wet gel is obtained by thermally stabilizing the wet gel after gelation at a temperature above or below room temperature. Allowing the wet get to thermally stabilize at room temperature prevents additional thermal stress on the gel during subsequent processing steps. The resting period, although not required for any of the methods recited herein, facilitates the processing of lower density gels which often possess less structural strength. In certain aspects, the resting period for thermal stabilization lasts for 2 minutes to 1 day, for 5 minutes to 12 hours or from 10 minutes to 2 hours. The appropriate time period for thermal stabilization is dependent upon the three-dimensional morphology of the gel and the thermal conductivity of the gelation vessel.

Although the DCPD monomer mixture gels within a few seconds, a few minutes, or a few hours, it has been found advantageous to age (post-cure) the wet gels at elevated temperatures for an additional period of time. Although not wishing to be bound by theory, post-curing of the wet gel is believed to increase the extent of polymerization and the number density of inter-strand cross-links which provides a stronger gel for easier handling and less breaking in subsequent processing steps. Aging at higher temperatures reduces the period of time required to obtain a stronger gel. This aging process is more beneficial for weaker gels prepared with lower target density. The preferable aging time period for use in the present invention varies from 1 hour to several days; more typically, ranges from 2 hours to 100 hrs. Aging temperatures ranges from 10° C. to 200° C., preferably from 20° C. to 150° C. It is also important that aging temperatures should be lower than the boiling points of solvents to preserve the pore structure of the wet gel (including nanopores and micropores). Preferred aging solvents for use in the present invention are hexane, toluene, methyl ethyl ketone, methyl isobutyl ketone, acetone, tetrahydrofuran, dichloromethane, 3-methyl-2-butanone, 2-propanol, 1-butanol, ethanol, methanol, water, or mixtures thereof. Optionally, additional catalysts including additional metathesis catalysts can be added in the aging solvents for further reaction. The aging solvents recommended to be added in enough volume to form a solvent layer over wet gel surface.

Thereafter, the polyDCPD based aerogels can be obtained from their wet gels after drying. The preferable drying for the present invention is under supercritical conditions which involves placing the solvent-filled gel in a temperature-controlled pressure vessel and bringing the vessel to a pressure above the critical pressure of CO2 by filling with CO2 gas or liquid CO2. In another embodiment, before the drying step, the solvent in the wet gel can be exchanged with liquid carbon dioxide. Modifiers, for example surfactants to reduce the interfacial energy, can be added to the carbon dioxide to make the gels more suitable for supercritical drying. At that point the vessel is then heated above the critical temperature of the CO2. After a few hours the pressure is slowly released from the vessel while keeping a constant temperature. After the vessel cools down and is at atmospheric pressure, the dried polyDCPD based aerogels are removed from the vessel.

After supercritical drying is complete, the dried polyDCPD based aerogels may be post cured to further increase cross-linking reaction. The post-curing the dried polyDCPD aerogels at an elevated temperature in the presence of a peroxide cross linking agent may result in better mechanical and chemical properties due to increased cross-linking density. Alternatively, the post curing methods disclosed in U.S. Pat. No. 5,728,785 may be used for the present invention. The preferred post curing temperature ranges from 30° C. to 200° C., more preferably from 50° C. to 180° C. The post curing may be conducted under air or inert gas depending on incorporating antioxidant.

The target density, which is also referred to herein as the theoretical density of the microporous material and/or aerogel refers to the density calculated based on the concentration of the monomer is the reaction solvent without any shrinkage due to processing or drying of the gel. Target densities for polyDCPD based aerogels provided herein are typically in a range from about 0.01 g/cm$^3$ to about 0.6 g/cm$^3$, or in a range of from about 0.02 g/cm$^3$ to about 0.5 g/cm$^3$. Densities of final aerogels are higher than their theoretical values because some shrinkage occurs during post-gelation processing, e.g., some shrinkage occurs during the aging of the gel or during supercritical drying of the gel.

The polyDCPD based aerogels prepared according to the process of the present invention generally have small pore sizes in the range 1 to 100 nm determined by Brunauer-Emmet-Teller (BET) nitrogen adsorption method (The average pore diameter is calculated as 4 V/A with V=cumulative pore volume per gram of material and A=specific surface area). BET surface areas of the aerogels prepared according to the process of the present invention are generally in the range 1 to 500 m$^2$/g.

The thermal conductivity coefficients of the polyDCPD based aerogels monoliths and composites depend on the final aerogel densities. At room temperature and atmospheric pressure the polyDCPD based aerogel monoliths and aerogel composites prepared according to the process of the present invention generally have thermal conductivity coefficients between 5 and 50 mW/m K, more generally between 10 to 40 mW/m K. The thermal conductivity coefficients of polyDCPD based aerogel monoliths and composites at a high vacuum pressure below 0.001 torr (or mm Hg) are generally lower than 10 mW/m K.

The potential applications for the present polyDCPD based aerogels include, but not to limited to, uses for thermal and acoustic insulation, radiation shielding, and vibrational damping materials in aerospace, military, and commercial applications. For example, space suit, gloves, footwear, and helmets, catalyst support, selectively permeable membrane, sensor, packing material, aircraft, cryogenic tanks, liquefied gas transport, systems for warming, storing, and/or transporting food and medicine, sleeping bags and pads, military and recreational cloth and tents, etc. . . . The present polyDCPD based aerogels can be also used or re-used as impact modifiers and/or filler materials for conventional plastics.

In order to better explain the present invention, the following examples are provided. These examples are intended to illustrate the present invention, and the present invention is not limited thereto.

Materials

Ultrene®-99: an ultra-high purity DCPD resin available from Cymetech, containing DCPD monomer of 99%.

Prometa® C0716: ruthenium catalyst package available from Cymetech, containing ruthenium catalyst of about 5% as an active component.

2-Propanol, 1-butanol, toluene, hexane, and acetone are purchased from Sigma-Aldrich of Milwaukee, Wis.

EXAMPLE 1

First, Ultrene®-99 (3.44 g; high purity DCPD) is weighed into a polypropylene container with a screw cap. Subsequently, toluene (96.45 g) is added and the mixture is stirred until a homogeneous solution results. Next, Prometa® C0716 ruthenium catalyst (0.07 g) is added to the homogeneous solution. After stirring for one minute to evenly disperse the catalyst through the mixture, the reaction mixture is allowed to stand and the time until gelation occurs is recorded. A portion of the sol is transferred into a plastic container containing quartz fiber batting to form a composite sample. The remaining portion in the original polypropylene container is used to form a monolith sample. The monolith and composite samples are gelled by sealing the respective containers to prevent evaporation and the containers are maintained in a quiescent condition to form a polymeric gel. After waiting an additional 30 minutes to ensure the uniform gelation of the mixture, acetone is added to each container in an amount sufficient to cover the gel surface. In this way, collapse of the pore structure due to evaporation of solvent out of the gel is minimized. The wet gels are aged for 20 hrs in an oven preset at 50° C.

Once the aging process is complete, the samples are cooled to room temperature and the wet gels are loaded into a pressure vessel having a volume of 60 L. After closure of the vessel, liquid CO$_2$ at about 10° C. is introduced into the vessel through a valve near the top of the vessel at a rate sufficient to generate about 1500 psig after 10 minutes. The acetone is exchanged with liquid carbon dioxide and the mixture CO$_2$ and acetone is withdrawn through a pressure relief system that maintains the pressure inside the vessel at 1500 psig. The CO$_2$ and acetone mixture is decompressed and reheated in separators where gaseous CO$_2$ and acetone are withdrawn, CO$_2$ is recycled through a standard liquefaction and pumping process. When little acetone remains in the pressure vessel, the temperature in the pressure vessel is increased to 50° C. for 50 minutes until a supercritical condition of the $CO_2$ is reached. After supercritically drying the sample for 1 hr, the pressure is slowly released from the vessel for a period of 90 min or until atmospheric conditions are reached. The dried aerogel is removed from the vessel.

The resulting polyDCPD based aerogel is opaque and has a light gray color (presumably due to the initial color of catalyst). Density of the monolithic polyDCPD based aerogel is 0.0426 g/cm$^3$, which correlates to a shrinkage factor (final dried density/target density) of about 1.42. The pore structure of the obtained gel is characterized by using Brunauer-Emmet-Teller nitrogen adsorption (BET) measurements. BET measurements on the first polyDCPD based aerogel reveal a surface area of 220 m$^2$/g. Thermal conductivity coefficient at a single temperature is 27.4 mW/m K, where the measurement is obtained according to standard ASTM C177 in the air at atmospheric pressure.

The quartz fiber-reinforced polyDCPD based aerogel composite of this example has a density of 0.0459 g/cm$^3$ and a thermal conductivity coefficient of 28.1 mW/m K.

EXAMPLE 2

First, Ultrene®-99 (5.73 g, DCPD monomer) is weighed into a polypropylene container with a screw cap. Toluene (94.16 g) is added to the container and the mixture is stirred to obtain a homogeneous solution. Prometa® C0716 ruthenium catalyst (0.11 g) is added to the stirred solution. After stirring thoroughly for one minute to ensure homogeneous dispersion of the catalyst, the same method as described in Example 1 are used for the gelation and aging steps.

Once the aging process was completed, the wet gel is loaded into a pressure vessel and is supercritically dried using the same method as described in Example 1. The resultant polyDCPD based aerogel is opaque and slightly gray in color. The resultant polyDCPD has a density of 0.069 g/cm$^3$ (shrinkage factor of about 1.38), a surface area of 213 m2/g, and thermal conductivity coefficient in air at atmospheric pressure of 25.7 mW/m K.

A quartz fiber-reinforced polyDCPD based aerogel composite is prepared by pouring a portion of the sol onto quartz fibers according to the method of Example 1. The aerogel composite has a density of 0.068 g/cm3 and thermal conductivity coefficient of 25.5 mW/m K.

EXAMPLE 3

Ultrene®-99 (8.00 g, DCPD monomer) is weighed into a polypropylene container with a screw cap. Toluene (91.84 g) is added to the container and the mixture is stirred to obtain a homogeneous solution. Prometa® C0716 ruthenium catalyst (0.16 g) is added to the homogeneous solution. After stirring for one minute to ensure a homogeneous dispersion, the sol is divided into a monolithic sample and a quartz fiber reinforced composite sample and each sample is treated with the gelation and aging steps as described in Example 1.

Once the aging process is complete, the wet gel is loaded into a pressure vessel and then supercritically dried by the method of Example 1. The monolithic polyDCPD based aerogel is opaque and slightly gray in color. The monolithic polyDCPD has a density of 0.1071 g/cm$^3$ (shrinkage factor of about 1.53), a surface area of 245 m$^2$/g, and a thermal conductivity coefficient in air at atmospheric pressure of 24.7 mW/m K.

The quartz fiber-reinforced polyDCPD based aerogel composite has a density of 0.0847 g/cm$^3$ and thermal conductivity coefficient of 25.1 mW/m K.

EXAMPLE 4

Ultrene®-99 (11.38 g, DCPD monomer) is weighed into a polypropylene container with a screw cap. Toluene (88.39 g) is added and the mixture stirred to obtain a homogeneous solution. Prometa® C0716 ruthenium catalyst (0.23 g) is added to the homogeneous solution. After stirring for one minute to ensure a homogeneous dispersion, the sol is divided into a monolithic sample and a quartz fiber reinforced composite sample and each sample is treated with the gelation and aging steps as described in Example 1.

Once the aging process is complete, the wet gel is loaded into a pressure vessel and then supercritically dried by the method of Example 1. The monolithic polyDCPD based aerogel is opaque and slightly gray in color. The monolithic polyDCPD has a density of 0.1440 g/cm$^3$ (shrinkage factor of about 1.44), a surface area of 250 m$^2$/g, and a thermal conductivity coefficient in air at atmospheric pressure of 23.2 mW/m K.

The quartz fiber-reinforced polyDCPD based aerogel composite of this example has a density of 0.1150 g/cm$^3$ and a thermal conductivity coefficient of 23.5 mW/m K.

EXAMPLE 5

Ultrene®-99 (14.74 g, DCPD monomer) is weighed into a polypropylene container with a screw cap. Toluene (84.96 g) is added and the mixture stirred to obtain a homogeneous solution. Prometa® C0716 ruthenium catalyst (0.29 g) is added to the homogeneous solution. After stirring for one minute to ensure a homogeneous dispersion, the sol is divided into a monolithic sample and a quartz fiber reinforced composite sample and each sample is treated with the gelation and aging steps as described in Example 1.

Once the aging process is complete, the wet gel is loaded into a pressure vessel and then supercritically dried by the method of Example 1. The monolithic polyDCPD based aerogel is opaque and slightly gray in color. The monolithic polyDCPD has a density of 0.1859 g/cm$^3$ (shrinkage factor of about 1.43), a surface area of 261 m$^2$/g, and a thermal conductivity coefficient in air at atmospheric pressure of 21.3 mW/m K.

The quartz fiber-reinforced polyDCPD based aerogel composite of this example has a density of 0.1599 g/cm$^3$ and a thermal conductivity coefficient of 22.9 mW/m K.

EXAMPLE 6

Ultrene®-99 (19.19 g, DCPD monomer) is weighed into a polypropylene container with a screw cap. Toluene (80.43 g) is added and the mixture stirred to obtain a homogeneous solution. Prometa® C0716 ruthenium catalyst (0.45 g) is added to the homogeneous solution. After stirring for one minute to ensure a homogeneous dispersion, the sol is divided into a monolithic sample and a quartz fiber reinforced composite sample and each sample is treated with the gelation and aging steps as described in Example 1.

Once the aging process is complete, the wet gel is loaded into a pressure vessel and then supercritically dried by the method of Example 1. The monolithic polyDCPD based aerogel is opaque and slightly gray in color. The monolithic polyDCPD has a density of 0.2295 g/cm$^3$ (shrinkage factor of about 1.35), a surface area of 276 m²/g, and a thermal conductivity coefficient in air at atmospheric pressure of 24.6 mW/m K.

The quartz fiber-reinforced polyDCPD based aerogel composite of this example has a density of 0.2091 g/cm³ and a thermal conductivity coefficient of 24.9 mW/m K.

EXAMPLE 7

Ultrene®-99 (11.34 g, DCPD monomer) is weighed into a polypropylene container with a screw cap. Toluene (87.53 g) is added and the mixture stirred to obtain a homogeneous solution. Prometa® C0716 ruthenium catalyst (1.13 g) is added to the homogeneous solution. After stirring for one minute to ensure a homogeneous dispersion, the sol is divided into a monolithic sample and a quartz fiber reinforced composite sample and each sample is treated with the gelation and aging steps as described in Example 1.

Once the aging process is complete, the wet gel is loaded into a pressure vessel and then supercritically dried by the method of Example 1. The monolithic polyDCPD based aerogel is opaque and slightly gray in color. The monolithic polyDCPD has a density of 0.157 g/cm³ (shrinkage factor of about 1.57), a surface area of 246 m²/g, and a thermal conductivity coefficient in air at atmospheric pressure of 27.7 mW/m K.

The quartz fiber-reinforced polyDCPD based aerogel composite of this example has a density of 0.156 g/cm³ and a thermal conductivity coefficient of 27.9 mW/m K.

EXAMPLE 8

Ultrene®-99 (11.39 g, DCPD monomer) is weighed into a polypropylene container with a screw cap. Toluene (88.58 g) is added and the mixture stirred to obtain a homogeneous solution. Prometa® C0716 ruthenium catalyst (0.02 g) is added to the homogeneous solution. After stirring for one minute to ensure a homogeneous dispersion, the sol is divided into a monolithic sample and a quartz fiber reinforced composite sample and each sample is treated with the gelation and aging steps as described in Example 1.

Once the aging process is complete, the wet gel is loaded into a pressure vessel and then supercritically dried by the method of Example 1. The monolithic polyDCPD based aerogel is opaque and slightly gray in color. The monolithic polyDCPD has a density of 0.159 g/cm³ (shrinkage factor of about 1.59), a surface area of 231 m²/g, and a thermal conductivity coefficient in air at atmospheric pressure of 30.7 mW/m K.

The quartz fiber-reinforced polyDCPD based aerogel composite of this example has a density of 0.145 g/cm³ and a thermal conductivity coefficient of 32.5 mW/m K.

EXAMPLE 9

The proportions of Ultrene-99, toluene, and Prometa® C0716 of Example 4 are combined in a different sequence. A catalyst solution is prepared by blending Prometa® C0716 ruthenium catalyst (0.23 g) in toluene (28.39 g) for 5 minutes. A monomer solution is prepared by dissolving Ultrene®-99 (11.38 g, DCPD monomer) in toluene (60 g) for 5 minutes. The catalyst solution and monomer solution are combined. After stirring for one minute to ensure a homogeneous dispersion, the sol is divided into a monolithic sample and a quartz fiber reinforced composite sample and each sample is treated with the gelation and aging steps as described in Example 1.

Once the aging process is complete, the wet gel is loaded into a pressure vessel and then supercritically dried by the method of Example 1. The monolithic polyDCPD based aerogel is opaque. The monolithic polyDCPD has a density of 0.1374 g/cm³ (shrinkage factor of about 1.37), a surface area of 253 m²/g, and a thermal conductivity coefficient in air at atmospheric pressure of 19.5 mW/m K.

The quartz fiber-reinforced polyDCPD based aerogel composite of this example has a density of 0.1322 g/cm³ and a thermal conductivity coefficient of 20.1 mW/m K.

EXAMPLE 10

The method described in Example 4 is used for preparation of polyDCPD based aerogels, except that 2-propanol (88.39 g) is used as a solvent in place of toluene.

The monolithic polyDCPD based aerogel is opaque and has some large pores dispersed in the aerogel structure. The monolithic polyDCPD has a density of 0.1074 g/cm³ (shrinkage factor of about 1.07), a surface area of 359 m²/g, and a thermal conductivity coefficient in air at atmospheric pressure of 33.3 mW/m K.

The quartz fiber-reinforced polyDCPD based aerogel composite of this example has a density of 0.1072 g/cm³ and a thermal conductivity coefficient of 25.8 mW/m K.

EXAMPLE 11

The method described in Example 4 is used for preparation of polyDCPD based aerogels, except that 2-butanol (88.39 g) is used as a solvent in place of toluene.

The monolithic polyDCPD based aerogel is opaque and has some large pores dispersed in the aerogel structure. The monolithic polyDCPD has a density of 0.1041 g/cm³ (shrinkage factor of about 1.04), a surface area of 303 m²/g, and a thermal conductivity coefficient in air at atmospheric pressure of 32.8 mW/m K.

The quartz fiber-reinforced polyDCPD based aerogel composite of this example has a density of 0.1022 g/cm³ and a thermal conductivity coefficient of 31.1 mW/m K.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A porous material comprising a cross-linked polymer formed by metathesis polymerization of at least one olefin feedstock selected from the group consisting of (a) polycyclic olefins having two or more rings and two or more carbon-carbon double bonds, (b) acyclic polyolefins having three or more unconjugated carbon-carbon multiple bonds, (c) cycloolefins substituted with one or more unconjugated alkene residues, and (d) oligomers and polymers formed by metathesis polymerization of monomer olefin (a), monomer olefin (b), or monomer olefin (c); wherein the density of the porous material is from about 0.01 g/cm³ to about 0.6 g/cm³.

2. The porous material of claim 1, wherein the cross-linked polymer is formed by ring-opening metathesis polymerization (ROMP) of at least one polycyclic olefin having (i) two or more rings which are fused, spiro, or joined in a cage ring system and (ii) two or more carbon-carbon double bonds wherein each ring has zero or one carbon-carbon double bond.

3. The porous material of claim 2, wherein the polycyclic olefin is selected from dicyclopentadiene, and monomers of any one of the formulae:

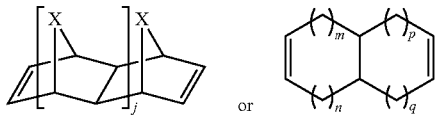

wherein X is CH₂ or oxygen;
j is 0, 1, 2, or 3;
m, n, p, q are independently selected from integers 0, 1, 2, 3, or 4 such that 0≤(m+n)≤1 or 3≤(m+n)≤4 and 0≤(p+q)≤1 or 3(≤p+q)≤4; and wherein each polycyclic olefin is unsubstituted or substituted with 0 to 6 substituents selected from $C_1$-$C_6$alkyl, $C_1$-$C_6$haloalkyl, $C_2$-$C_6$alkenyl, $C_2$-$C_6$alkynyl, halogen, $C_1$-$C_6$alkoxy, $C_1$-$C_6$alkanoyl, and $C_1$-$C_6$carboxyalkyl.

4. The porous material of claim 3, wherein the polycyclic olefin comprises a substituted or unsubstituted component selected from norbornadiene, dicyclopentadiene.

5. The porous material of claim 1 wherein the aerogel is composed of the cross-linked polymer and between 0.0001% and 5% by weight of a transition metal.

6. The porous material of claim 5, wherein the transition metal is selected from niobium, tantalum, chromium, molybdenum, tungsten, rhenium, iron, ruthenium, osmium, or a mixture thereof.

7. The porous material of claim 5, wherein the transition metal is between 0.001% and about 1% by weight of the aerogel and the transition metal is selected from molybdenum, tungsten, rhenium, ruthenium, or osmium.

8. The porous material of claim 1, composed of a cross-linked polymer and at least one reinforcement material selected from the group consisting of fibers, fiber aggregates, nonwoven/woven fabrics, fibrous batting, lofty fibrous batting, particles and combinations thereof.

9. The porous material of claim 8, composed of the cross-linked polymer and at least one additive selected from the group consisting of IR opacifiers, antioxidants, flame retardant agents, organic or inorganic fillers, crosslinking agents, elastomers, binders, plasticizers, pigments, dyes and combination thereof.

10. A polydicyclopentadiene aerogel based composition prepared form the steps comprising:
mixing at least one olefin feedstock comprising at least one dicyclopentadiene monomer, a metathesis polymerization catalyst and at least one solvent to form a mixture;
maintaining the mixture in a quiescent state at a temperature suitable for gel formation until the mixture forms a gel, and
drying said gel using a supercritical fluid thereby obtaining an aerogel material.

11. The composition of claim 10, wherein the gel comprises a polymer formed by ring-opening metathesis polymerization of the dicyclopentadiene monomer.

12. The composition of claim 11, wherein the polymer is crosslinked.

13. The composition of claim 12, wherein said polydicyclopentadiene aerogel based composition is post cured at elevated temperature under either air or inert gas to increase the number of cross-linkages.

14. The composition of claim 10, wherein the olefin feedstock comprises more than 80% dicyclopentadiene monomer by weight.

15. The composition of claim 10, wherein said metathesis polymerization catalyst comprises a ring-opening metathesis polymerization (ROMP) catalyst.

16. The composition of claim 15, wherein said ROMP catalyst are selected from the group consisting of ruthenium alkylidene complexes, osmium alkylidene complexes, molybdenum alkylidene complexes and tungsten alkylidene complexes, and combinations thereof.

17. The composition of claim 15, wherein the ROMP catalyst is a complex of the formula $(L)_i(X)_2M(CR_1R_2)$ wherein M is ruthenium or osmium;
L is a neutral electron donor ligand, which is independently selected at each occurrence of L;
X is an anionic ligand, which is independently selected at each occurrence of X;
$R_1$ and $R_2$ are independently selected from hydrogen and residues selected from the group consisting of $C_1$-$C_8$alkyl, $C_2$-$C_8$alkenyl, $C_2$-$C_8$alkynyl, $C_3$-$C_8$cycloalkyl, 4 to 8 membered heterocycles, and aryl, each of which is substituted with 0 to 5 substituents independently selected from the group consisting of $C_1$-$C_8$alkyl, $C_2$-$C_8$alkenyl, $C_2$-$C_8$alkynyl, $C_3$-$C_8$cycloalkyl, $C_1$-$C_8$alkoxy, $C_2$-$C_8$alkenyloxy, $C_2$-$C_8$alkynyloxy, $C_1$-$C_8$alkylthio, $C_1$-$C_8$alkylsulfonyl, $C_1$-$C_8$alkylsulfinyl, $C_1$-$C_8$alkanoyl, $C_1$-$C_8$alkoxycarbonyl, $C_1$-$C_8$alkanoyloxy, mono- and di-$C_1$-$C_8$alkyl amino, and phenyl; and
i is 1 or 2.

18. The composition of claim 14, wherein the dicyclopentadiene monomer content is between 2 and 40% by weight of the solvent dicyclopentadiene monomer mixture.

19. The composition of claim 14, further comprising the step of adding reinforcement materials selected from the group consisting of fibers, fibrous batting, particles and any combination thereof.

20. The composition of claim 14, further comprising the step of incorporating additives into the materials where the additives are selected from the group consisting of IR opacifiers, antioxidants, flame retardant agents, organic or inorganic fillers, crosslinking agents, elastomers, binders, plasticizers, pigments, dyes and any combination thereof.

21. A polyolefin aerogel based composition prepared by a process comprising the steps of:
   mixing at least one olefin feedstock, a metathesis polymerization catalyst and at least one solvent to form a mixture;
   maintaining the mixture in a quiescent state at a temperature suitable for gel formation until the mixture forms a gel; and
   drying said gel using a supercritical fluid thereby obtaining the aerogel material, wherein the olefin feedstock is selected from (a) polycyclic olefins having two or more rings and two or more carbon-carbon double bonds, (b) acyclic polyolefins having three or more unconjugated carbon-carbon multiple bonds, (c) cycloolefins substituted with one or more unconjugated alkene residues, and (d) oligomers and polymers formed by metathesis polymerization of monomer olefin (a), monomer olefin (b), or monomer olefin (c).

22. The composition of claim 10, wherein the density of the aerogel is from 0.01 $g/cm^3$ to about 0.6 $g/cm^3$.

23. The composition of claim 21, wherein the density of the aerogel is from 0.01 $g/cm^3$ to about 0.6 $g/cm^3$.

\* \* \* \* \*